United States Patent
Choi

(10) Patent No.: US 11,265,361 B2
(45) Date of Patent: Mar. 1, 2022

(54) ELECTRONIC DEVICE FOR TRANSMITTING/RECEIVING DATA THROUGH EXTERNAL ELECTRONIC DEVICE, AND DATA TRANSMITTING/RECEIVING METHOD THEREFOR

(71) Applicant: SAMSUNG ELECTRONICS CO., LTD., Gyeonggi-do (KR)

(72) Inventor: Pilsik Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/960,176

(22) PCT Filed: Dec. 27, 2018

(86) PCT No.: PCT/KR2018/016765
§ 371 (c)(1),
(2) Date: Jul. 6, 2020

(87) PCT Pub. No.: WO2019/135551
PCT Pub. Date: Jul. 11, 2019

(65) Prior Publication Data
US 2021/0058445 A1    Feb. 25, 2021

(30) Foreign Application Priority Data
Jan. 3, 2018    (KR) .................. 10-2018-0000869

(51) Int. Cl.
*G06F 15/16*    (2006.01)
*H04L 67/02*    (2022.01)
(Continued)

(52) U.S. Cl.
CPC ............ *H04L 67/02* (2013.01); *H04L 67/327* (2013.01); *H04L 69/22* (2013.01)

(58) Field of Classification Search
CPC ........ H04L 67/02; H04L 67/327; H04L 69/22
(Continued)

(56) References Cited

U.S. PATENT DOCUMENTS 8,331,399 B2 * 12/2012 Meylan ................... H04L 1/008
370/466
8,755,404 B2 * 6/2014 Viswanathan .......... H04W 4/18
370/466

(Continued)

FOREIGN PATENT DOCUMENTS

KR    1020160049969    5/2016
KR    1020170049579    5/2017
(Continued)

OTHER PUBLICATIONS

PCT/ISA/210 Search Report issued on PCT/KR2018/016765, dated Apr. 2, 2019, pp. 5.
(Continued)

*Primary Examiner* — Moustafa M Meky
(74) *Attorney, Agent, or Firm* — The Farrell Law Firm, P.C.

(57) ABSTRACT

An electronic device according to various embodiments of the present invention comprises a communication circuit, at least one memory, and at least one processor, which is electrically connected to the communication circuit and the at least one memory, wherein the at least one memory, when executed, can store instructions allowing the at least one processor to: connect to a first external electronic device through the communication circuit; include a header based on a second protocol in first data generated in order to be transmitted to a second external electronic device by a first application using a first protocol; generate second data in which at least a part of the header based on the second protocol is changed; and transmit the second data to the first
(Continued)

external device. Additional various embodiments are possible.

10 Claims, 9 Drawing Sheets

(51) Int. Cl.
*H04L 67/63* (2022.01)
*H04L 69/22* (2022.01)

(58) Field of Classification Search
USPC ........................................................ 709/203
See application file for complete search history.

(56) References Cited

U.S. PATENT DOCUMENTS

| | | | | |
|---|---|---|---|---|
| 8,923,285 | B2* | 12/2014 | Wentink | H04L 69/22 |
| | | | | 370/389 |
| 10,021,695 | B2* | 7/2018 | Eitan | H04L 1/009 |
| 10,097,696 | B2* | 10/2018 | Isomaki | H04W 4/70 |
| 10,098,173 | B2* | 10/2018 | Zeng | H04W 72/048 |
| 10,511,525 | B2* | 12/2019 | Gage | H04L 47/18 |
| 10,785,777 | B2* | 9/2020 | Eitan | H04B 7/0426 |
| 2007/0070913 | A1* | 3/2007 | Kallio | H04L 69/32 |
| | | | | 370/252 |
| 2013/0070745 | A1 | 3/2013 | Nixon et al. | |
| 2015/0043421 | A1* | 2/2015 | Shimizu | H04W 76/12 |
| | | | | 370/315 |
| 2016/0119166 | A1 | 4/2016 | Shin et al. | |
| 2016/0330738 | A1* | 11/2016 | Eitan | H04L 27/2602 |
| 2017/0048914 | A1* | 2/2017 | Zeng | H04W 28/08 |
| 2017/0180277 | A1 | 6/2017 | Brady et al. | |
| 2017/0280495 | A1 | 9/2017 | Zhang et al. | |
| 2018/0041453 | A1 | 2/2018 | Zhe | |
| 2020/0077317 | A1* | 3/2020 | Sharma | H04W 28/0268 |

FOREIGN PATENT DOCUMENTS

| | | |
|---|---|---|
| KR | 1020170119098 | 10/2017 |
| WO | WO2017113654 | 7/2017 |

OTHER PUBLICATIONS

PCT/ISA/237 Written Opinion issued on PCT/KR2018/016765, dated Apr. 2, 2019, pp. 6.

* cited by examiner

| Registration ID | Client Name | Destination | Destination IP | Destination Port | Assigned Port | Status |
|---|---|---|---|---|---|---|
| 1 | OCF Controllee | coaps+tcp://samsungiotcloud.com:443 | | | 8791 | Created |
| 1 | OCF Controllee | coaps+tcp://samsungiotcloud.com:443 | | | 8791 | Connection |
| 1 | OCF Controllee | coaps+tcp://samsungiotcloud.com:443 | 1.2.3.4 | 443 | 8791 | Connected |
| ... | | | | | | |

FIG.5

```
{
   "type": "request",
   "messageId": 1,
   "message" : "registration",
   "params": {
       "destination" :"coaps+tcp:// samsungiotcloud.com:443"
   }
}
```

FIG.6

```
{
   "type": "response",
   "messageId": 1,
   "message" : "registration",
   "params": {
         "destination":"coaps+tcp:// samsungiotcloud.com:443"
   },
   "redirectUrl": "127.0.0.1:8791"
}
```

FIG.7

ELECTRONIC DEVICE FOR TRANSMITTING/RECEIVING DATA THROUGH EXTERNAL ELECTRONIC DEVICE, AND DATA TRANSMITTING/RECEIVING METHOD THEREFOR

PRIORITY

This application is a National Phase Entry of International Application No. PCT/KR2018/016765, which was filed on Dec. 27, 2018, and claims priority to Korean Patent Application No. 10-2018-0000869 filed in the Korean Intellectual Property Office on Jan. 3, 2018, the content of each of which is incorporated herein by reference.

BACKGROUND

1. Field

Various embodiments of the disclosure relate to an electronic device for transmitting or receiving data through an external electronic device and a data transmission/reception method therefor.

1. Description of the Related Art

An electronic device may provide various functions in the state of being linked with an external electronic device via wireless communication. The electronic device may be connected to an external electronic device via short-range wireless communication, and the electronic device may transmit or receive data to or from an external electronic device located a short distance therefrom. For example, even in case that a wearable device does not include a wireless communication circuit for reception of an SMS message, if the wearable electronic device is connected to a mobile electronic device via Bluetooth, the wearable electronic device may receive the SMS message, which is received by the mobile electronic device, via Bluetooth.

SUMMARY

An electronic device may perform data communication with an external electronic device through a network environment of another external electronic device connected to the electronic device. In a case that an electronic device does not support a first protocol supported by an external electronic device, the electronic device may have difficulty in using, without change, the first protocol. Meanwhile, if the electronic device converts the first protocol into a protocol supported by the electronic device, another electronic device having received the converted protocol and using the first protocol may have difficulty in interpreting the converted protocol.

According to various embodiments, even in a case that an electronic device does not support a first protocol supported by an external electronic device, the electronic device may transmit, without changing the first protocol in the electronic device, first-protocol-based data to another external electronic device through still another external electronic device by using a second protocol supported by the electronic device.

An electronic device according to various embodiments may include: a communication circuit; at least one memory; and at least one processor, which is electrically connected to the communication circuit and the at least one memory, wherein the at least one memory stores instructions which, when executed, cause the at least one processor to: establish a connection to a first external electronic device through the communication circuit; include a header based on a second protocol in first data generated for transmission to a second external electronic device by a first application using a first protocol; generate second data in which at least a part of the header based on the second protocol is changed; and transmit the second data to the first external device.

An electronic device according to various embodiments may include: a first communication circuit; a second communication circuit; at least one memory; and at least one processor, which is electrically connected to the first communication circuit, the second communication circuit, and the at least one memory, wherein the at least one memory stores instructions which, when executed, cause the at least one processor to: establish a connection to a first external electronic device through the first communication circuit; receive first data, which is generated based on a first protocol and to which a header based on a second protocol is added, from the first external electronic device; and transmit the first data to the second external device through the second communication circuit, based on information relating to the second external electronic device, included in the header based on the second protocol.

According to various embodiments, an electronic device that does not support a network environment according to a first protocol may transmit first-protocol-based data by using a second protocol through an external electronic device supporting a network environment according to the second protocol.

According to various embodiments, an electronic device that does not support a network environment according to a first protocol may perform data communication with an external electronic device of the network environment according to the first protocol without changing the first protocol, by using a second protocol and an application using the first protocol.

BRIEF DESCRIPTION OF THE DRAWINGS

FIG. 5 illustrates an example of a table including information on mapping between an application using a CoAP protocol and a server providing the CoAP-protocol-based interface according to various embodiments.

FIG. 6 illustrates an example of a request generated by an application using a CoAP protocol according to various embodiments.

FIG. 7 illustrates an example of a response in which an electronic device provides port information about an HTTP protocol to an application using a CoAP protocol according to various embodiments.

DETAILED DESCRIPTION

Figure 1:
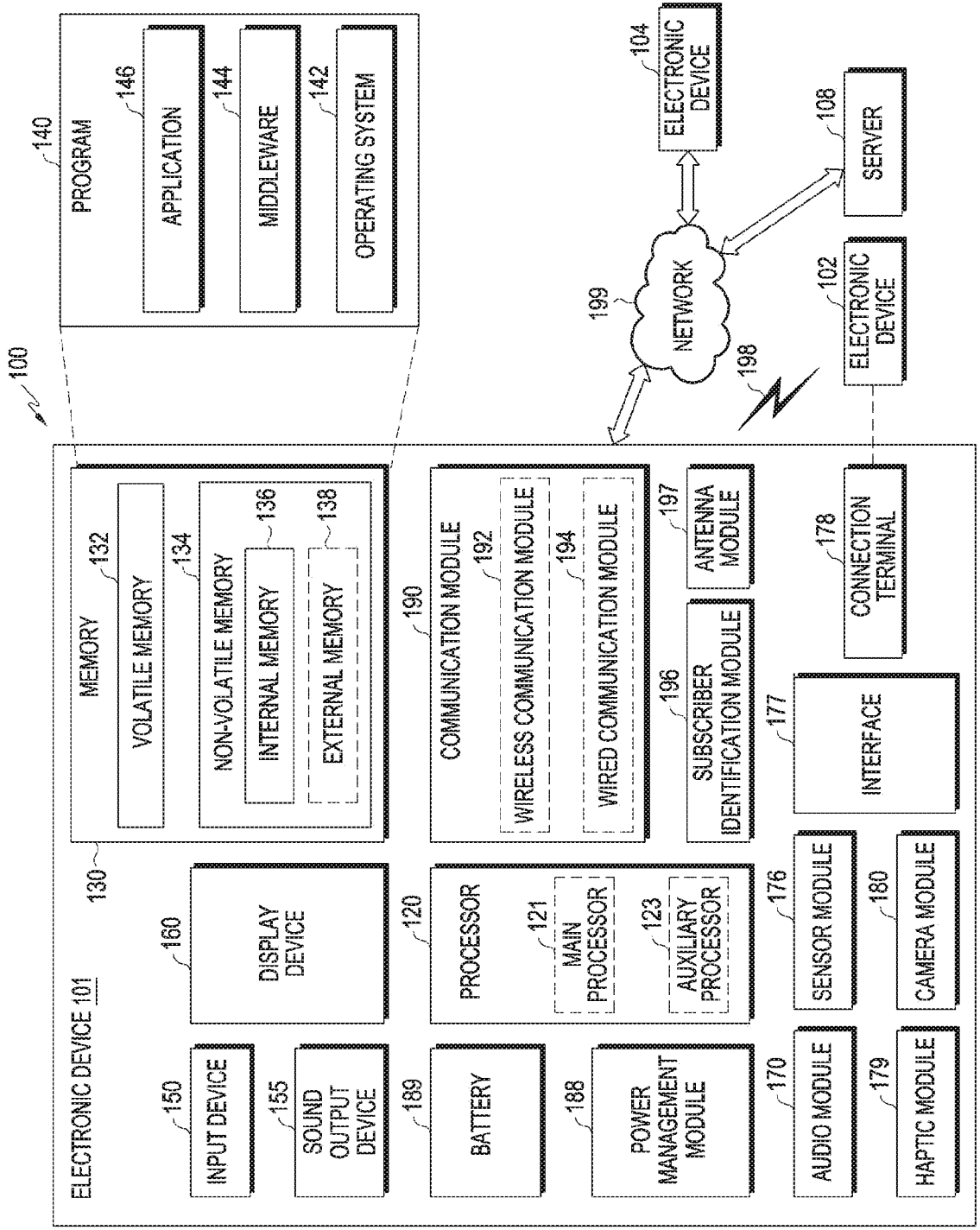
FIG. 1 is a block diagram of an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a fourth network 198 (e.g., a short-range wireless communication network), or an electronic device 104 or a server 108 via a second network 199 (e.g., a long-range wireless communication network). According to an embodiment, the electronic device 101 may communicate with the electronic device 101 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiments, at least one (e.g., the display device 160 or the camera module 180) of the components may be omitted from the electronic device 101, or other components may be added in the electronic device 101. In some embodiment some components may be implemented to be integrated together, for example, as if the sensor module 176 (e.g., a fingerprint sensor, an iris sensor, or an illuminance sensor) is embedded in the display device 160 (e.g., a display).

The processor 120 may drive, for example, software a program 140) to control at least one other component (e.g., a hardware or software component) of the electronic device 101 connected with the processor 120 and may process or compute various data. The processor 120 may load and process an instruction or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor (AP)) and an auxiliary processor 123 that is operable independently from the main processor 121. In addition to, or instead of, the main processor 121, the processor 120 may include an auxiliary processor 123 (e.g., a graphics processing unit (GPU), an image signal processor, a sensor hub processor, or a communication processor) that consumes less power than the main processor 121 or is specified for a designated function. Here, the auxiliary processor 123 may be operated separately from or embedded in the main processor 121.

In such case, the auxiliary processor 123 may control, for example, at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or sensor module 176) of the electronic device 101, for example, software (e.g., the program 140) and input data or output data for an instruction related to the software. The memory 130 may include the volatile memory 132 or the non-volatile memory 134.

The program 140, as software stored in the memory 130, may include, for example, an operating system (OS) 142, middleware 144, or an application 146.

The input device 150 may be a device for receiving an instruction or data, which is to be used for a component (e.g., the processor 120) of the electronic device 101, from an outside (e.g., a user) of the electronic device 101. The input device 150 may include, for example, a microphone, a mouse, or a keyboard.

The sound output device 155 may be a device for outputting sound signals to the outside of the electronic device 101. The sound output device 155 may include, for example, a speaker which is used for general purposes, such as playing multimedia or recording and playing, and a receiver used for call receiving purposes only. According to an embodiment, the receiver may be formed integrally or separately from the speaker.

The display 160 may be a device for visually providing information to a user of the electronic device 101. The display device 160 may include, for example, a display, a hologram device, or a projector and a control circuit for controlling the display, hologram device, or projector. According to an embodiment, the display 160 may include a touch circuitry or a pressure sensor capable of measuring the strength of a pressure with respect to a touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) wiredly or wirelessly coupled with the electronic device 101.

The sensor module 176 may generate an electrical signal or data value corresponding to an internal operating state (e.g., power or temperature) or external environmental state of the electronic device 101. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, for example, an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or motion) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, for example, a power management integrated circuit (PMIC).

The battery 189 may be a device for supplying power to at least one component of the electronic device 101. The battery 189 may include, for example, a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., an local area network (LAN) communication module or a power-line communication module), and may communicate with the external electronic device using corresponding communication module via the fourth network 198 (e.g., a short-range communication network, such as Bluetooth™, BLE (bluetooth low energy), wireless-fidelity (Wi-Fi) direct, or infrared data association (IrDA)) or the second network 199 (e.g., a long-range communication network, such as a cellular network, the Internet, or a computer network (e.g., an LAN or wide area network (WAN))). The above-enumerated types of communication modules 190 may be implemented in a single chip, or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

At least some of the above-described components may be coupled mutually and communicate signals (e.g., instructions or data) therebetween via an inter-peripheral communication scheme (e.g., a bus, general purpose input and output (GPM), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic device 102 and the electronic device 104 may be a device of the same type as or a different type than the electronic device 101. According to an embodiment, some or all of operations performed by the electronic device 101 may be performed in another electronic device or a plurality of other electronic devices. According to an embodiment, when the electronic device 101 has to perform a function or a service automatically or at a request, the electronic device 101 may request an external electronic device to perform at least some functions associated with the function or the service, instead of or in addition to executing the function or the service. The external electronic device having received the request may execute the requested function or additional function and deliver the execution result to the electronic device 101. The electronic device 101 may then process or further process the received result to provide the requested function or service. To that end, a cloud computing, distributed computing, or client-server computing technology may be used, for example.

An electronic device (e.g., the electronic device 101) according to various embodiments may include: a communication circuit (e.g., a communication module 190); at least one memory (e.g., a memory 130); at least one processor 120, which is electrically connected to the communication circuit and the at least one memory, wherein the at least one memory stores instructions which, when executed, cause the at least one processor 120 to: establish a connection to a first external electronic device through the communication circuit; include a header based on a second protocol in first data generated by a first application using a first protocol to be transmitted to a second external electronic device; generate second data in which at least a part of the header based on the second protocol is changed; and transmit the second data to the first external device.

According to various embodiments, the first protocol may be a constrained application protocol (CoAP) protocol, and the first data may include a header and a payload according to the CoAP protocol.

According to various embodiments, the second protocol may be a hypertext transfer protocol (HTTP) protocol, and the first data may include a header based on the HTTP protocol.

According to various embodiments, the header based on the HTTP protocol included in the first data may include a dedicated (redirect) address for the first external electronic device including a port number assigned to the first application based on the HTTP protocol.

According to various embodiments, the header based on the HTTP protocol, included in the second data, may include an address for the second external electronic device and a port number for the second external electronic device.

According to various embodiments, the HTTP protocol may support transmission of the second data, by the first external electronic device, which has received the second data, to the second external electronic device based on header information based on the HTTP protocol.

An electronic device 101 according to various embodiments may, when receiving, from the first external electronic device, third data transmitted by the second external electronic device, transmit the third data to the first application.

In an electronic device 101 according to various embodiments, the communication circuit 190 supports short-range wireless communication, and the at least one processor 120 may be connected to the first external electronic device via the short-range wireless communication.

An electronic device 101 according to various embodiments may include: a first communication circuit (e.g., the first network module 198); a second communication circuit (e.g., the second network module 199); at least one memory (e.g., the memory 130); and at least one processor (e.g., the processor 120), which is electrically connected to the first communication circuit 198, the second communication circuit 199, and the at least one memory 130, wherein the at least one memory 130 stores instructions which, when executed, cause the at least one processor 120 to: establish a connection to a first external electronic device through the first communication circuit 198; receive first data, which is generated based on a first protocol and to which a header based on a second protocol is added, from the first external electronic device; and transmit the first data to the second external device through the second communication circuit 199, based on information relating to the second external electronic device included in the header based on the second protocol.

According to various embodiments, the first protocol is a CoAP protocol, the first data includes a header and a payload according to the CoAP protocol, and the second external electronic device may conform to an OCF specification and provide the CoAP-protocol-based interface.

According to various embodiments, the second protocol is an HTTP protocol, and the first data may include an address and a port number for the second external electronic device.

According to various embodiments, the first communication circuit 198 may support short-range wireless communication, and the second communication circuit 199 may support long-range wireless communication.

Figure 2:
FIG. 2 illustrates an open connectivity foundation (OCF)-based Internet of Things (IoT) cloud environment according to various embodiments.

FIG. 2 illustrates an open connectivity foundation (OCF)-based Internet of Things (IoT) cloud environment according to various embodiments. The OCF specification may specify technology for providing an IoT cloud. The IoT cloud environment may be embodied as, for example, an OCF cloud environment. The OCF cloud environment may include an IoT cloud (e.g., an OCF cloud 220), an IoT device (e.g., an OCF controllee 210), and a device (e.g., an OCF controller 230) that controls the CT device through the OCF cloud 220. According to various embodiments, an OCF cloud that conforms to the OCF specification may provide a constrained application protocol (CoAP)-based interface. The OCF controllee 210 (e.g., the electronic device 104 of FIG. 1), the OCF controller 230 (e.g., the electronic device 101 of FIG. 1), and the OCF cloud 220 (e.g., the server 108 of FIG. 1) may communicate with each other based on the CoAP protocol. For reference, the OCF specification may be described at http://openconnectivity.org/developer/specifications, and the CoAP protocol may be described at http://tools.ietf.org/html/rfc7252.

The OCF controller 230 and the OCF controllee 210 may communicate with the OCF cloud 220 while being connected via transport layer security (TLS) based on the CoAP protocol. The OCF controller 230 may provide a function of controlling or monitoring the OCF controllee 210, and the OCF controllee 210 may provide a function that the OCF controller 230 may control or monitor as a device. The OCF cloud 220 may transfer data (e.g., instructions, status information data, etc.) between the OCF controllee 210 and the OCF controller 230, registered based on user identification information. For example, the OCF controller 230 may be a mobile electronic device (e.g., the electronic device 101 of FIG. 1), and the OCF controllee 210 may be a TV. The mobile electronic device may remotely turn on or off the power of the TV connected through the OCF cloud 220.

Figure 3:
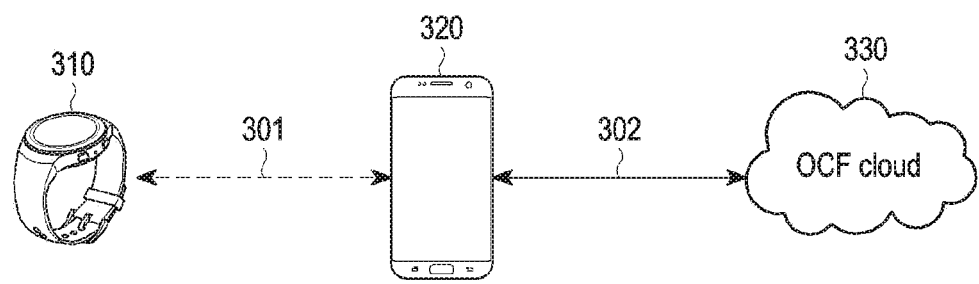
FIG. 3 illustrates an example illustrating the situation in which a wearable electronic device performs data communication with an OCF cloud through a mobile electronic device according to various embodiments.

FIG. 3 illustrates an example illustrating the situation in which a wearable electronic device performs data communication with an OCF cloud through a mobile electronic device according to various embodiments. According to various embodiments, a wearable electronic device 310 may perform data communication with an OCF cloud 330 (e.g., the server 108 of FIG. 1) through a mobile electronic device 320. The wearable electronic device 310 may serve as an OCF controller (e.g., the OCF controller 230 of FIG. 2) or an OCF controllee (e.g., the OCF controllee 210 of FIG. 2) by using the mobile electronic device 320. According to various embodiments, the wearable electronic device 310 and the mobile electronic device 320 may include the same or at least part of the same configuration as the electronic device 101 of FIG. 1.

According to various embodiments, the wearable electronic device 310 may be connected to the mobile electronic device 320 via short-range wireless communication 301 (e.g., the first network 198 of FIG. 1). For example, the wearable electronic device 310 may perform data communication with the mobile electronic device 320 using Bluetooth or BLE. The OCF cloud 330 may provide long-distance wireless communication 302, and the mobile electronic device 320 capable of performing long-distance wireless communication may be connected to the OCF cloud 330 according to the long-distance wireless communication 302 (for example, the second network 199 of FIG. 1). For example, the mobile electronic device 320 may perform data communication with the OCF cloud 330 using Wi-Fi or cellular. According to various embodiments, the wearable electronic device 310 may perform data communication with the OCF cloud 330 through the mobile electronic device 320. For example, data transmitted to the mobile electronic device 320 by the wearable electronic device 310 over Bluetooth may be transferred to the OCF cloud 330 over Wi-Fi by the mobile electronic device 320. Alternatively, the data transmitted to the mobile electronic device 320 over Wi-Fi by the OCF cloud 330 may be transferred to the wearable electronic device 310 over Bluetooth by the mobile electronic device 320. The wearable electronic device 310 according to various embodiments may use the network environment of the mobile electronic device 320, and the mobile electronic device 320 may provide a network environment to the wearable electronic device 310. For example, even in a case that the wearable electronic device 310 does not include a circuit for cellular communication, the wearable electronic device 310 may be connected to the mobile electronic device 320 using a Bluetooth communication circuit provided in the wearable electronic device 310, and may use cellular communication provided in the mobile electronic device 310.

The OCF cloud 330 may conform to the OCF specification in order to provide an IoT cloud environment, and may provide the CoAP-protocol-based interface to the OCF controller and the OCF controllee. For example, the OCF cloud 330 may provide a transmission control protocol (TCP) and a user datagram protocol (UDP). The wearable electronic device 310, as an OCF controller, may establish a TCP connection to the OCF cloud 330 over the TCP protocol.

Figure 4:
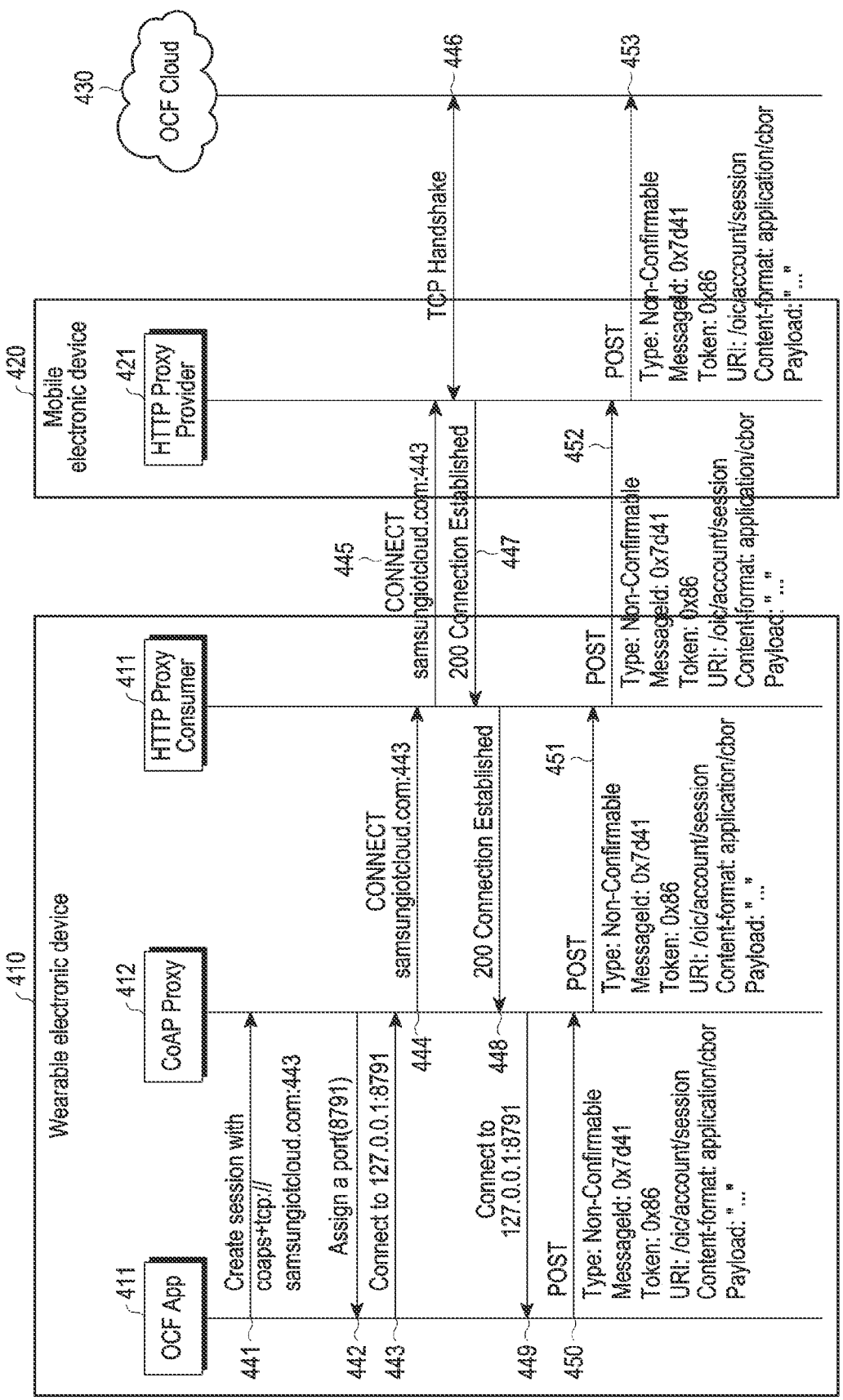
FIG. 4 is a sequence diagram illustrating the scenario in which a wearable electronic device is connected to an OCF cloud according to a TCP protocol through a mobile electronic device according to various embodiments.

FIG. 4 is a sequence diagram illustrating the scenario in which a wearable electronic device is connected to an OCF cloud according to a TCP protocol through a mobile electronic device according to various embodiments. A wearable electronic device 410 (e.g., the wearable electronic device 310 of FIG. 3) according to various embodiments may include an OCF application 411, a CoAP proxy 412, and an HTTP proxy consumer 413, and at least one processor the processor 120 of FIG. 1) included in the wearable electronic device 410 may operate as the OCF application 411, the CoAP proxy 412, and the HTTP proxy consumer 413. The mobile electronic device 420 (e.g., the mobile electronic device 320 of FIG. according to various embodiments may include an HTTP proxy provider 421, and at least one processor (e.g., the processor 120 of FIG. 1) included in the mobile electronic device 420 may operate as the HTTP proxy provider 421. The OCF cloud 430 may provide the CoAP-protocol-based interface.

In operation 441, the OCF application 411 may request the CoAP proxy 412 to create a session in order to establish a connection with the OCF cloud 430. When requesting session creation, address information of the OCF cloud 430 (e.g., "coaps+tcp://samsungiotcloud.com:443") may be included. For example, FIG. 6 illustrates a session creation request written in JSON form according to various embodiments, which will be described later in detail.

In operation 442, the CoAP proxy 412 may assign a port number to the OCF application 411, and may provide a response including the assigned port information. For example, the OCF application 411 may be assigned the port number "8791". The response may include assigned port information and address information (e.g., "127.0.0.1") of the mobile electronic device 420. According to various embodiments, the address of the mobile electronic device 420 may include a port number (e.g., a transmission control protocol (TCP)) included in the mobile electronic device 420. For example, FIG. 7 illustrates a response written in JSON form in response to a session creation request according to various embodiments, and details will be described later.

The CoAP proxy 412 may store and manage information on mapping between the OCF application 411 and the OCF cloud 430 to be connected using the OCF application 411. The CoAP proxy 412 may designate a virtual port in the OCF application 411 in order to relay data transmission by the OCF application 411 to the OCF cloud 430, and may map address information of the OCF cloud 430 to the OCF application 411. Based on a mapping relationship, the CoAP proxy 412 may detect data transmission or reception to or from a port assigned to the OCF application. For example, the CoAP proxy 412 may apply socket listening to the assigned port. FIG. 5 illustrates a mapping table managed by the CoAP proxy 412 according to various embodiments, which will be described later in detail.

In operation 443, the OCF application 411 may make a request for a TCP connection to the OCF cloud 430 using a dedicated address (redirect URL) including the assigned port information. The dedicated address may include an address for the mobile electronic device 420. For example, the dedicated address may include the address "127.0.0.1" of the mobile electronic device 420 and the assigned port number "8791".

In operation 444, the CoAP proxy 412 may receive the request for a TCP connection through the assigned port "8791", and then search the mapping table for an OCF cloud address mapped to the assigned port "8791". For example, the searched OCF cloud address may be "coaps+tcp://samsungiotcloud.com:443". The CoAP proxy 412 may transfer a CONNECT HTTP method to the HTTP proxy consumer 413 via the address of the OCF cloud 430 (for example, "coaps+tcp://samsungiotcloud.com:443") in order to use a tunneling function supported by the HTTP protocol. According to various embodiments, the address of the OCF cloud 430 may include a port number (e.g., TCP) assigned to the OCF cloud 430.

In operation 445, the HTTP proxy consumer 413 of the wearable electronic device 410 may transmit the CONNECT HTTP method to the HTTP proxy provider 421 of the mobile electronic device 420 via the address of the OCF cloud. Regardless of whether the wearable electronic device 410 supports the TCP network environment, the HTTP proxy consumer 413 may transmit the CONNECT HTTP method over, for example, Bluetooth, to the mobile electronic device 420 connected to the wearable electronic device 410.

In operation 446, the HTTP proxy provider 421 of the mobile electronic device 420 establishes a TCP connection to the address of the OCF cloud 430 in order to process the received CONNECT HTTP method. The mobile electronic device 420 may support the TCP network environment, and the mobile electronic device 420 may establish a TCP connection with the OCF cloud 430 using the TCP network environment for the OCF application 411.

In operation 447, when the TCP connection with the OCF cloud 430 is completed, the HTTP proxy provider 421 of the mobile electronic device 420 may provide information indicating completion of the TCP connection to the HTTP proxy consumer 413 of the wearable electronic device 410. For example, the HTTP proxy provider 421 may transmit a "200 Connection Established" message according to the TCP protocol to the HTTP proxy consumer 413.

In operation 448, the HTTP proxy consumer 413 may notify the CoAP proxy 412 that the TCP connection with the OCF cloud 430 is completed.

In operation 449, the CoAP proxy 412 may identify the OCF application 411 connected to the OCF cloud 430 based on the address information of the OCF cloud 430 from among the information indicating completion of the TCP connection with the OCF cloud 430. For example, the CoAP proxy 412 may identify information about the OCF cloud 430 to which the TCP connection is completed and information about the OCF application 411 corresponding thereto, using the mapping table including a mapping relationship between the OCF application 411 and the OCF cloud 430. Based on the identified information, the CoAP proxy 412 notifies the OCF application 411 that the connection with the OCF cloud 430 is completed via the address of the mobile electronic device 420 and the port number assigned to the OCF application 411.

In operation 450, the OCF application 411 may transmit a CoAP message to the CoAP proxy 412 via a dedicated address in order to transmit data to the OCF cloud 430 based on the connection with the Off cloud 430. The CoAP message may include a CoAP header and a body according to the CoAP protocol. The body according to the CoAP protocol includes a payload, and the payload may be referred to as a body. Table 1 is an example of a CoAP message.

| | |
|---|---|
| Header | Type: Non-Confirmable |
| | MessageId: 0x7d41 |
| | Token: 0x86 |
| | URI: /oic/account/session |
| | Content-format: application/cbor |
| Body | Payload: "..." |

Figure 8A:
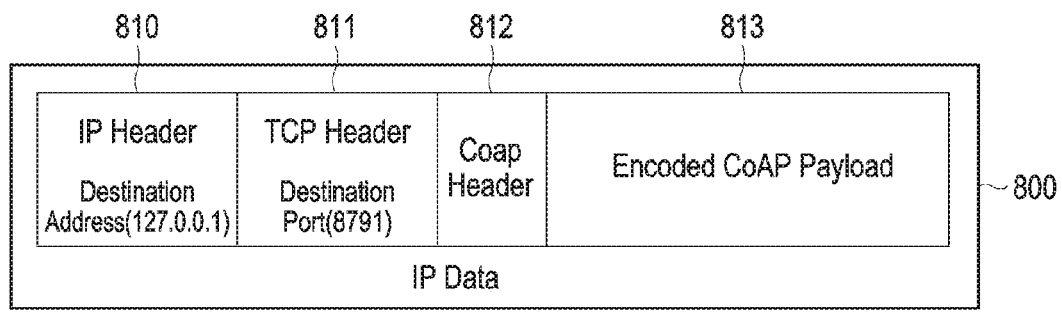
FIG. 8A illustrates an example of data generated by an application using a CoAP protocol according to various embodiments.

The OCF application 411 may generate IP data by encoding the CoAP message and then adding a TCP/IP header to the encoded CoAP message in order to perform transmission according to the TCP protocol. FIG. 8A illustrates an example of IP data generated by the OCF application 411, and details will be described later.

In operation 451, the CoAP proxy 412 may change a destination address in the TCP/IP header included in IP data to the address of the OCF cloud 430 based on the mapping relationship between the OCF application 411 and the OCF cloud 430, and may transmit the address of the OCF cloud 430 to the HTTP proxy consumer 413.

In operation 452, the HTTP proxy consumer 413 of the wearable electronic device 410 may transmit IP data in which the TCP/IP header is changed, to the HTTP proxy provider 421 of the mobile electronic device 420.

In operation 453, the HTTP proxy provider 421 of the mobile electronic device 420 may transmit IP data including a CoAP message to the OCF cloud 430, which is the final destination.

FIG. 5 illustrates an example of a table including information on mapping between an application using a CoAP protocol and a server providing a CoAP-protocol-based interface according to various embodiments. An electronic device (e.g., the wearable electronic device 410 of FIG. 4) according to various embodiments may use a network environment of an external electronic device (e.g., the mobile electronic device 420 of FIG. 4), which is connected to the electronic device, such that an application (e.g., the OCF application 411 of FIG. 4) using the CoAP protocol can be connected to the OCF cloud (e.g., the Off cloud 430 of FIG. 4) that provides the CoAP-protocol-based interface. The wearable electronic device 410 according to various embodiments may generate a registration table including a mapping relationship between the OCF application 411 using the CoAP protocol and the OCF cloud 430 that provides the CoAP-protocol-based interface, and may store the registration table in at least one memory (e.g., the memory 130 of FIG. 1) included in the wearable electronic device 410. The wearable electronic device 410 may update status information of the registration table based on a connection status between the OCF application 411 and the OCF cloud 430.

Referring to FIG. 5, the registration table may include registration identification information (Registration ID) for the OCF application, a name (Client Name) of the OCF application, an address (Destination) of the OCF cloud to be connected using the OCF application, an IP address (Destination IP) of the OCF cloud, a port number (Destination Port) of the OCF cloud, a port number assigned to the OCF application (Assigned Port), and/or information on a connection status between the OCF application and the OCF cloud. For example, in the electronic device 410 according to various embodiments, the CoAP proxy 412 of the wearable electronic device 410, for example, in FIG. 4, may generate and manage a registration table.

Upon receiving a request for a session connection with the OCF cloud 430 from the OCF application 411, the CoAP proxy 412 may assign a virtual port for the OCF application 411, in operation 442. The CoAP proxy 412 may generate information on the OCF application 411 in the registration table after assigning the virtual port. For example, the CoAP proxy 412 may generate an identification number and a virtual port number of the OCF application 411, and may identify information on the OCF application 411 and information on the OCF cloud 430 to be connected using the OCF application 411, so as to generate one row of the assignment table.

In operation 444, the CoAP proxy 412 may transmit the CONNECT HTTP method to the HTTP proxy consumer 413 via the address of the OCF cloud 430, and may then update the status information as shown in the second row of the registration table. The HTTP protocol provides support not only for direct transmission of data to the OCF cloud 430 by the mobile electronic device 420, but also for transmission of data to the OCF cloud 430 through the mobile electronic device 420 by the wearable electronic device 410. This is called a tunneling function. For example, in the case of the HTTP protocol, the tunneling function may be provided by defining the CONNECT HTTP method, but in the case of the CoAP protocol, the tunneling function may not be provided.

In operation 449, the CoAP proxy 412 searches the assignment table for port information mapped to the address of the connected OCF cloud 430, and notifies the OCF application 411 corresponding to the searched port information that the TCP connection to the corresponding port has been established. After operation 449, the registration table may update the status information to a "connected" status in order to indicate that the OCF application 411 and the OCF cloud 430 are in a connected state. The CoAP proxy 412 may update the IP address and the port number of the OCF cloud 430, as shown in row 3 of the registration table.

FIG. 6 illustrates an example of a request generated by an application using a CoAP protocol according to various embodiments. A session creation request including the address of an OCF cloud to be connected using the application using the CoAP protocol (e.g., the OCF application 411 of FIG. 4) may be transmitted, in JSON form, to a CoAP proxy (e.g., the CoAP proxy 412 in FIG. 4).

The request in FIG. 6 is made based on the HTTP protocol; and may include "request", indicating that the request is a request, and the OCF cloud address (e.g., "coaps+tcp://samsungiotcloud.com:443") as a parameter.

FIG. 7 illustrates an example of a response in which an electronic device provides port information about an HTTP protocol to an application using a CoAP protocol according to various embodiments. The application using the CoAP protocol (e.g., the OCF application 411 in FIG. 4) may transmit a request for session creation to the OCF cloud and may then receive a response including port information assigned to the Off application 411 from the CoAP proxy (e.g., the CoAP proxy 412 of FIG. 4). The response of FIG. 7 is made based on the HTTP protocol, and may include "response", indicating that the response is a response, may, include the OCF cloud address (e.g., "coaps+tcp://samsungiotcloud.com:443") as a parameter, and may include a dedicated address (e.g., "127.0.0.1:8791"). The dedicated address may be the IP address of another electronic device according to tunneling, supported by the HTTP protocol, and a port number assigned to the application.

Figure 8B:
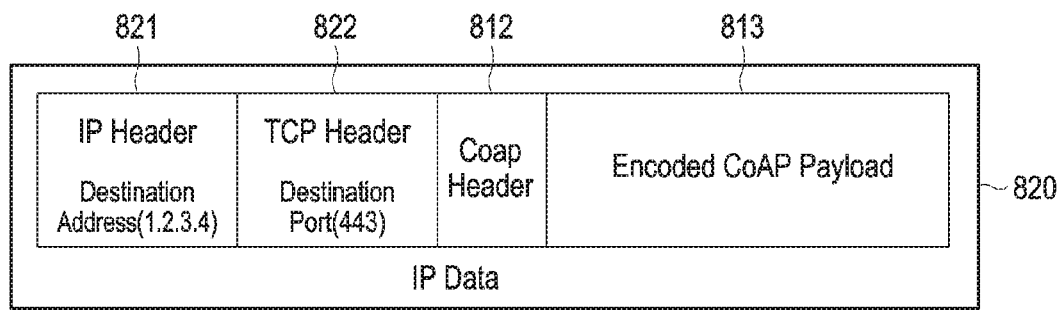
FIG. 8B illustrates an example of data changed from data of FIG. 8A for transmission to a mobile electronic device by a wearable electronic device according to various embodiments.

The electronic device according to various embodiments may include a header based on the HTTP protocol in data for transmission to an OCF cloud, and transmit the data to a mobile electronic device connected to the electronic device, by using HTTP tunneling and an application using a CoAP protocol so as to enable the mobile electronic device to transmit the data to the OCF cloud. FIG. 8A illustrates an example of data generated by an application using a CoAP protocol according to various embodiments, and FIG. 8B illustrates an example of data changed from data of FIG. 8A for transmission to a mobile electronic device by a wearable electronic device according to various embodiments.

The application using the CoAP protocol may serve as an OCF controller or an OCF controllee, and may be, for example, referred to as an OCF application (e.g., the OCF application 411 of FIG. 4). The OCF application may generate a CoAP message according to the CoAP protocol in order to perform transmission to the OCF cloud (e.g., the OCF cloud 430 of FIG. 4). The CoAP message may be encoded for data transmission, for example, may be encoded according to a content-format. In order to use HTTP tunneling, the OCF application may include a TCP/IP header according to the HTTP protocol in the encoded CoAP message. The IP data 800 of FIG. 8A may include a header 812 and a payload 813, in which a CoAP message generated according to the CoAP protocol is encoded, and may include an IP header 810 and a TCP header 811 according to the I-FLIP protocol. In the TCP header, a port number assigned to an OCF application may be included as a destination port number. In the IP header, an address of another electronic device (e.g., the mobile electronic device 420 of FIG. 4) that needs to be passed through for HTTP tunneling may be included as a destination address.

A wearable electronic device (for example, the wearable electronic device 410 of FIG. 4) according to various embodiments may generate new IP data 820 by changing the IP data of FIG. 8A, that is, by changing headers 801 and 811 according to the HTTP protocol by using information about an OCF cloud to be connected using an OCF application, based on information on mapping between the OCF application and the OCF cloud. For example, the destination address of the OCF cloud mapped to the OCF application may be "1.2.3.4", and the port number of the OCF cloud may be "443". The wearable electronic device according to various embodiments may store and manage a mapping relationship between the OCF application and the OCF cloud based on the assignment table, as shown in FIG. 5. In the IP data 820 of FIG. 8B, the IP header 821 and the TCP header 822 may be changed based on the information about the OCF cloud, and the CoAP message generated based on the CoAP protocol may include the same data as that of FIG. 8A. According to various embodiments, the CoAP header and payload created based on the CoAP protocol are not changed and may be transmitted as is to the mobile electronic device and/or the OCF cloud.

Figure 9A:
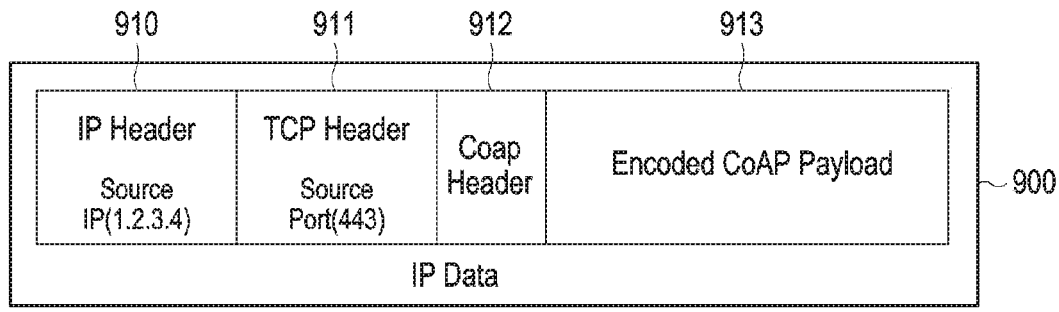
FIG. 9A illustrates an example of IP data, which is received from a mobile electronic device by a wearable electronic device according to various embodiments.
Figure 9B:
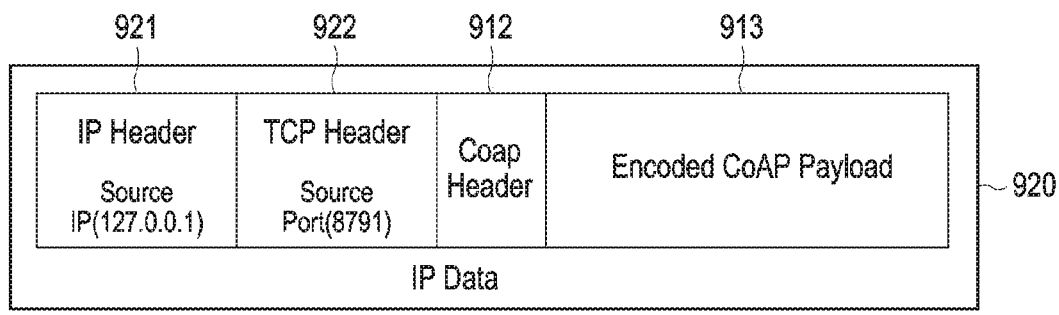
FIG. 9B illustrates an example of IP data changed from IP data of FIG. 9A for transmission to an OCF application by a wearable electronic device according to various embodiments.

The wearable electronic device according to various embodiments may receive, from the mobile electronic device, data transmitted by the Off cloud, and may transfer the received data to the OCF application corresponding to the OCF cloud. FIG. 9A illustrates an example of IP data received from the mobile electronic device by the wearable electronic device according to various embodiments, and FIG. 9B illustrates an example of IP data changed from IP data of FIG. 9A for transmission to an OCF application by a wearable electronic device according to various embodiments.

IP data 900 of FIG. 9A is data which is transmitted by an OCF cloud (e.g., the OCF cloud 430 of FIG. 4) that provides an interface according to the CoAP protocol, and includes a CoAP message generated according to the CoAP protocol. For example, the CoAP message includes a CoAP header 912 and a CoAP payload 913. The IP data 900 may include a header based on the HTTP protocol for transmission to a wearable electronic device (e.g., the wearable electronic device 410 of FIG. 4) through a mobile electronic device (e.g., the mobile electronic device 420 of FIG. 4). The header based on the HTTP protocol may include an IP header 910 and a TCP header 911, and may be created based on information on the OCF cloud. For example, the IP header 910 may include the address of the OCF cloud as a source IP, and the TCP header 911 may include a port number of the OCF cloud as a source port number.

The wearable electronic device according to various embodiments may search for an OCF application (e.g., the OCF application 411 of FIG. 4) mapped to the OCF cloud, based on the port number of the TCP header of the received IP data 900. The wearable electronic device may change the IP data 900 to the data shown in FIG. 9B based on information about the searched OCF application. The IP data 920 of FIG. 9B may include a source IP in an IP header 921 according to the HTTP protocol, and the source IP may include the address of the mobile electronic device that transmitted the IP data 900 to the wearable electronic device. The IP data 920 may include a TCP header 922 according to the HTTP protocol, wherein the TCP header 922 includes a port number assigned to the OCF application. The CoAP message of FIG. 9B may be the same as the CoAP message of FIG. 9A, and may be transferred to the OCF application by including therein, without change, the CoAP header 912 and the CoAP payload 913 transmitted by the OCF cloud.

Figure 10:
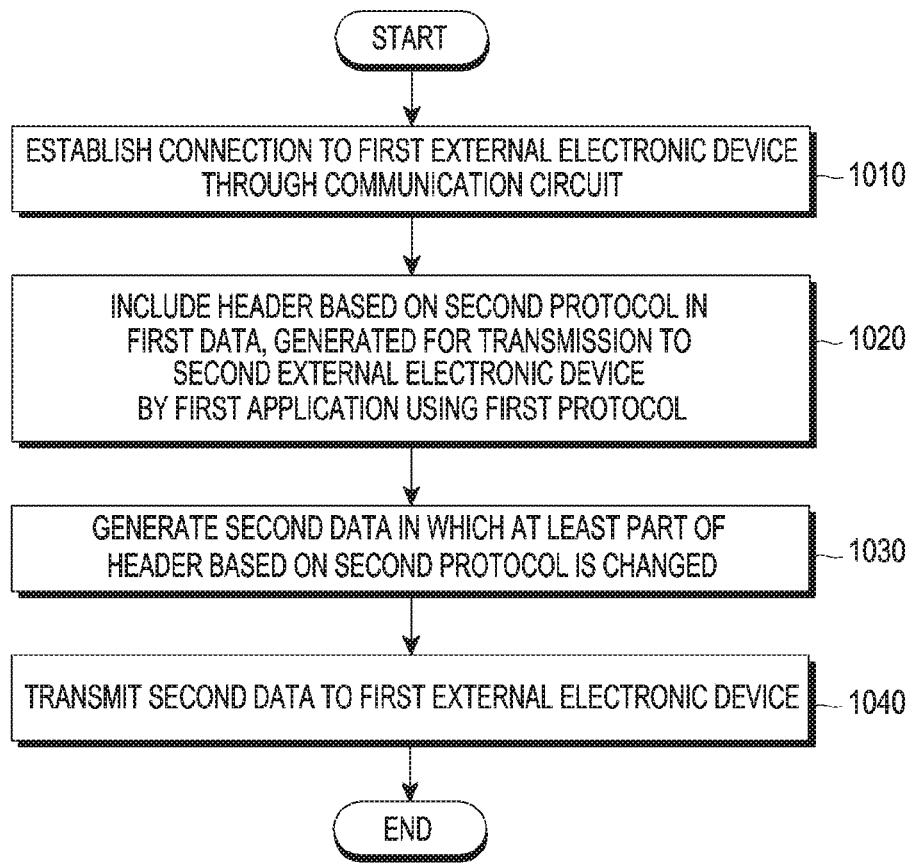
FIG. 10 is a flowchart illustrating a method for transmitting data to a second external electronic device through a first external electronic device by an electronic device according to various embodiments.

FIG. 10 is a flowchart illustrating a method for transmitting data to a second external electronic device through a first external electronic device by an electronic device according to various embodiments.

In operation 1010, an electronic device (e.g., the wearable electronic device 310 of FIG. 3) according to various embodiments may be connected to a first external electronic device (e.g., the mobile electronic device 320 of FIG. 3) through a communication circuit. For example, the wearable electronic device 310 may be connected to the mobile electronic device 320 via Bluetooth.

In operation 1020, the wearable electronic device 310 may include a header based on a second protocol in first data, which is transmitted to a second external electronic device (e.g., the OCF cloud 330 of FIG. 3) by a first application using a first protocol. For example, the first protocol may be a CoAP protocol, and the first application may be an OCF application. The first data may include a CoAP header and a payload generated according to the CoAP protocol. The wearable electronic device 310 according to various embodiments, if a network environment for transmission of a CoAP message is not provided therein, may use HTTP protocol-based tunneling, supported by the mobile electronic device 320, in order to establish a connection with the Off cloud through the mobile electronic device 320. For the HTTP tunneling, the wearable electronic device 310 may include an IP/TCP header based on the HTTP protocol in the first data based on the CoAP protocol. According to various embodiments, the wearable electronic device 310 may assign a virtual port to the OCF application using the CoAP protocol and identify the Off application, and may manage the OCF application by including information on the OCF cloud to be connected using the OCF application therein. According to various embodiments, the header based on the HTTP protocol included in the first data may include a dedicated address for the mobile electronic device and a port number assigned to the OCF application.

In operation 1030, the wearable electronic device 310 may generate second data by changing at least a part of the header based on the second protocol from the first data. For example, the second protocol may be the HTTP protocol, and the wearable electronic device 310 may generate second data by changing the TCP/IP header from the first data based on the second external electronic device, that is, the OCF cloud information.

In operation 1040, the wearable electronic device 310 may transmit the second data to the first external electronic device. For example, the wearable electronic device 310 may transmit the second data, using Bluetooth, to the first external electronic device connected via Bluetooth.

Figure 11:
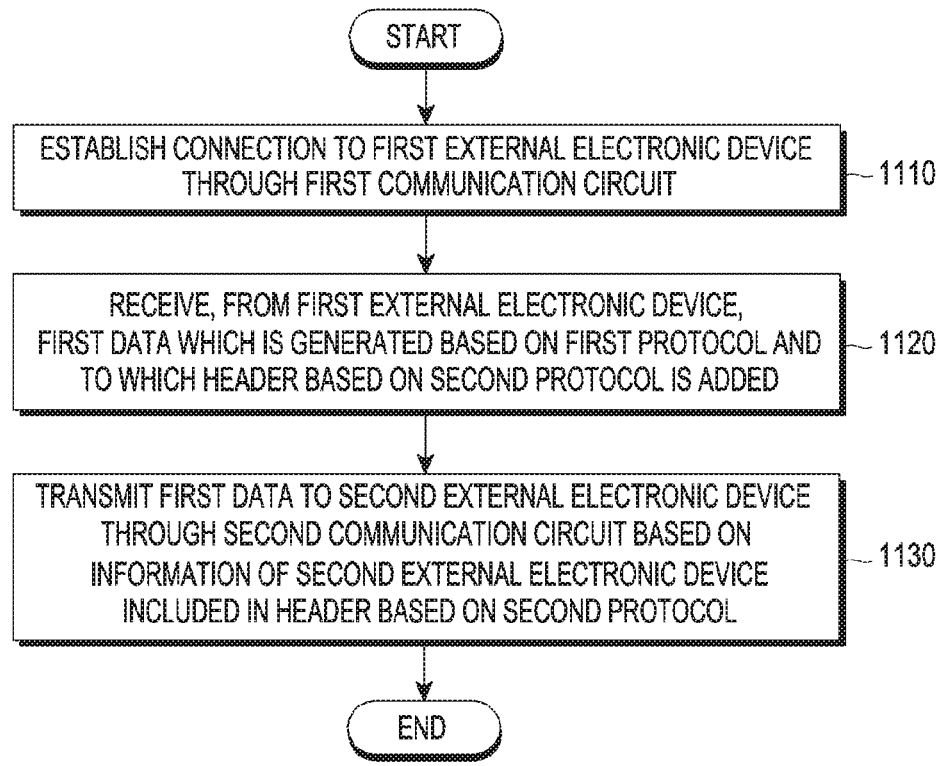
FIG. 11 is a flowchart illustrating a method for transmitting data, received from a first external electronic device, to a second external electronic device by an electronic device according to various embodiments of the disclosure.

FIG. 11 is a flowchart illustrating a method for transmitting data, received from a first external electronic device, to a second external electronic device by an electronic device according to various embodiments of the disclosure.

In operation 1110, an electronic device (e.g., the mobile electronic device 320 of FIG. 3) may be connected to the first external electronic device (e.g., the wearable electronic device 310 of FIG. 3) through a first communication circuit.

In operation 1120, the mobile electronic device 320 may receive first data, which is generated from the wearable electronic device 310 based on the first protocol and to which a header based on a second protocol is added. For example, the first protocol may be a CoAP protocol, and the first data may include a header and a payload according to the CoAP protocol.

In operation 1130, the mobile electronic device 320 may transmit the first data to the second external electronic device through a second communication circuit based on information about the second external electronic device, included in the header based on the second protocol. For example, the second protocol may be an HTTP protocol. The second communication circuit may support a network environment conforming to the HTTP protocol. The second external electronic device according to various embodiments may conform to the OCF specification and provide the CoAP-protocol-based interface. For example, the second external electronic device may be an OCF cloud.

Various embodiments of the disclosure provide a non-transitory computer-readable recording medium in which instructions configured to cause at least one processor to execute at least one operation are stored, the at least one operation including: establishing a connection to a first external electronic device, by the at least one processor (e.g., the processor 120 of FIG. 1), using a communication circuit (e.g., the communication module 190 of FIG. 1); including a header based on the second protocol in first data generated for transmission to a second external electronic device by a first application using the first protocol; generating second data in which at least a part of the header based on the second protocol is changed; and transmitting the second data to the first external electronic device.

According to a non-transitory computer-readable recording medium according to various embodiments, the first protocol may be a CoAP protocol, and the first data may include a header and a payload according to the CoAP protocol.

According to a non-transitory computer-readable recording medium according to various embodiments, the second protocol may be an HTTP protocol, and the first data may include a header based on the HTTP protocol.

According to a non-transitory computer-readable recording medium according to various embodiments, the header based on the HTTP protocol included in the first data may include a dedicated address for the first external electronic device including a port number assigned to the first application based on the HTTP protocol.

According to a non-transitory computer-readable recording medium according to various embodiments, the header based on the HTTP protocol, included in the second data, may include an address for the second external electronic device and a port number for the second external electronic device.

According to a non-transitory computer-readable recording medium according to various embodiments, the HTTP protocol may support transmission of the second data, by the first external electronic device which has received the second data, to the second external electronic device based on header information based on the HTTP protocol.

A computer-readable recording medium according to various embodiments may further include an operation of, in response to receiving, from the first external electronic device, third data transmitted by the second external electronic device, transmitting the third data to the first application.

According to a non-transitory computer-readable recording medium according to various embodiments, the communication circuit 190 supports short-range wireless communication, and the at least one processor 120 may be connected to the first external electronic device via the short-range wireless communication.

Hereinafter, the electronic device according to various embodiments may be various types of electronic devices. The electronic devices may include, for example, at least one of a portable communication device (e.g., a smart phone), a computer device, a portable multimedia device, a portable medical device, a camera, a wearable device, or a home appliance. The electronic devices according to an embodiment are not limited to those described above.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar elements. Singular expressions may include plural expressions, unless the context clearly indicates otherwise. As used herein, each of such phrases as "A or B," "at least one of A and B," "at least one of A or B," "A, B, or C," "at least one of A, B, and C," or "at least one of A, B, or C," may include all possible combinations of the items enumerated together in a corresponding one of the phrases. Expressions such as "first," "second," "primarily," or "secondary," used herein may modify corresponding elements regardless of order or importance, are used to only distinguish one element from another and do not limit corresponding elements. When it is described that an element (e.g., a first element) is "(operatively or communicatively) coupled with/ to" or "connected" to another element (e.g., a second element), the element can be directly connected to the other element or can be connected to the other element through another element (e.g., a third element).

A term "module" used herein may mean, for example, a unit including hardware, software, or firmware, and may be used interchangeably with terms such as logic, a logic block, a part, or a circuit. The module may be a single integral component, or a minimum unit or part thereof, adapted to perform one or more functions. For example, the module may be implemented as an application-specific integrated circuit (ASIC).

Various embodiments as set forth herein may be implemented as software (e.g., the program 140) including instructions that are stored in a storage medium (e.g., internal memory 136 or external memory 138) that is readable by a machine (e.g., computer). The machine may invoke stored instructions from the storage medium and operate according to the invoked instructions, and may include an electronic device (e.g., the electronic device 101) according to the disclosed embodiments. When the instructions are executed by a processor (e.g., the processor 120), the processor may perform functions corresponding to the instructions directly or by using other elements under the control of the processor. The instructions may include a code generated or executed by a compiler or an interpreter. The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

A method according to various embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least a part of the computer program product may be temporarily generated or at least temporarily stored in the machine-readable storage medium, such as memory of the manufacturer's server, a server of the application store, or a relay server.

Each of the components (e.g., a module or a program), according to various embodiments, may be configured as a single entity or a plurality of entities, and some of the sub-components described above may be omitted, or other sub-components may be further included in the various embodiments. Alternatively or additionally, some components (e.g., modules or programs) may be integrated into a single entity, and the integrated elements may still perform functions in the same or similar manner as they are performed by corresponding components before the integration. Operations performed by the module, the program, or another component according to various embodiments may be carried out sequentially, in parallel, repeatedly, or heuristically, or at least some operations may be executed in a different order or omitted, or other operations may be added.

The embodiments disclosed herein are proposed to help with the description and comprehension of disclosed technical contents, and do not limit the scope of the various embodiments of the disclosure. Therefore, the scope of the various embodiments of the disclosure should be construed as including all modifications or various other embodiments based on the technical idea of the disclosure.

The invention claimed is:

1. An electronic device comprising:
   a communication circuit;
   at least one memory storing an application; and
   at least one processor, which is electrically connected to the communication circuit and the at least one memory,
   wherein the at least one memory stores instructions which, when executed, cause the at least one processor to:
   establish a connection to a first external electronic device through the communication circuit;
   generate, by using the application, first data including a header and a payload based on a first protocol and a header based on a second protocol for transmission to a second external electronic device, wherein the first protocol is a constrained application protocol (CoAP) and the second protocol is a hypertext transfer protocol (HTTP);
   generate second data in which at least a part of the header based on the second protocol is changed; and
   transmit the second data to the first external device.

2. The electronic device of claim 1, wherein the header based on the HTTP included in the first data includes a dedicated address for the first external electronic device including a port number assigned to the application based on the HTTP.

3. The electronic device of claim 1, wherein a header based on the HTTP included in the second data includes an address for the second external electronic device and a port number for the second external electronic device.

4. The electronic device of claim 1, wherein the HTTP supports transmission of the second data, via the first external electronic device, to the second external electronic device based on header information based on the HTTP.

5. The electronic device of claim 1, wherein the at least one memory further comprises instructions configured to cause the at least one processor to, in response to receiving, from the first external electronic device, third data transmitted by the second external electronic device, transmit the third data to the application.

6. The electronic device of claim 1, wherein the communication circuit supports short-range wireless communication, and
   the at least one processor is connected to the first external electronic device via the short-range wireless communication.

7. An electronic device comprising:
   a first communication circuit;
   a second communication circuit;
   at least one memory; and
   at least one processor, which is electrically connected to the first communication circuit, the second communication circuit, and the at least one memory,
   wherein the at least one memory stores instructions which, when executed, cause the at least one processor to:
   establish a connection to a first external electronic device through the first communication circuit;
   receive first data, which includes a header and a payload based on a first protocol and a header based on a second protocol, from the first external electronic device, wherein the first protocol is a constrained application protocol (CoAP) and the second protocol is a hypertext transfer protocol (HTTP); and
   transmit the first data to the second external device through the second communication circuit, based on information relating to the second external electronic device, included in the header based on the second protocol.

8. The electronic device of claim 7, wherein
   the second external electronic device conforms to an open connectivity foundation (OCF) specification and provides an interface based on the CoAP.

9. The electronic device of claim 7, wherein the first data includes an address and a port number for the second external electronic device.

10. The electronic device of claim 7, wherein the first communication circuit supports short-range wireless communication, and the second communication circuit supports long-range wireless communication.

* * * * *